D. H. FANNING.
Corset.
No. 159,753
Patented Feb. 16, 1875.
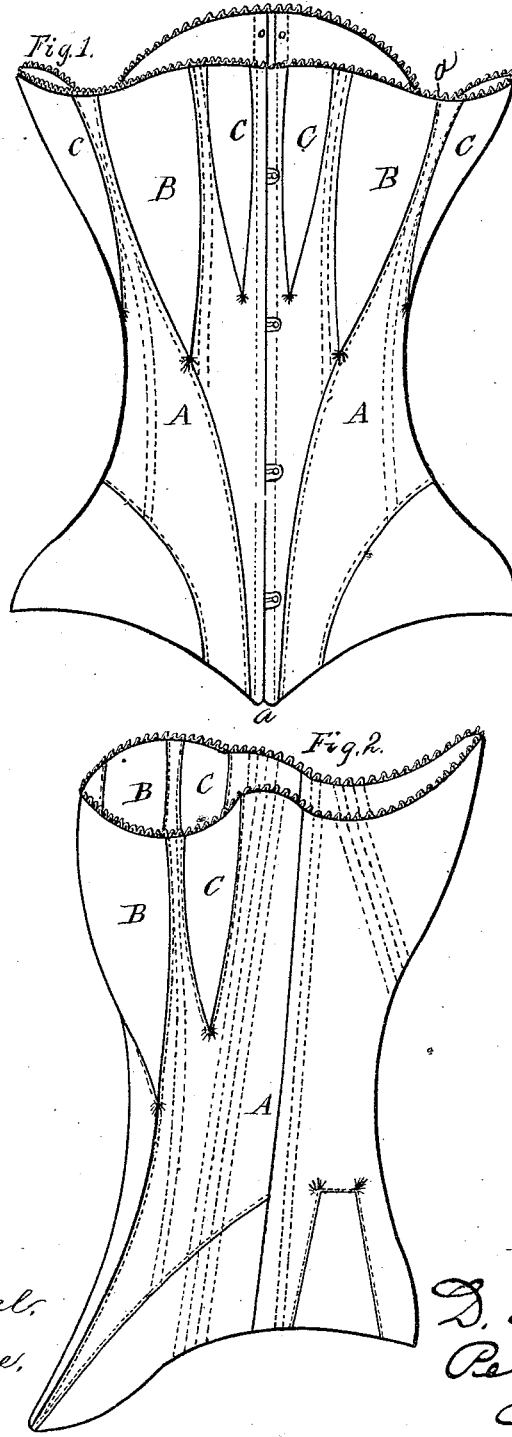

UNITED STATES PATENT OFFICE.

DAVID H. FANNING, OF WORCESTER, MASSACHUSETTS.

IMPROVEMENT IN CORSETS.

Specification forming part of Letters Patent No. 159,753, dated February 16, 1875; application filed January 4, 1875.

*To all whom it may concern:*

Be it known that I, DAVID H. FANNING, of Worcester, county of Worcester and State of Massachusetts, have invented certain new and useful Improvements in Corsets, of which the following is a specification:

My invention relates to the class of corsets having three gores in the front part; and the nature of my invention consists in having the middle cut through, or a seam intersecting it, whereby a graceful curve is obtained, and a perfect-fitting corset made.

In order to enable others skilled in the art to which my invention appertains to make and use the same, I will now proceed to describe its construction and operation, referring to the annexed drawing, which forms a part of this specification, and in which—

Figure 1 is a front view of a corset embodying my invention, and Fig. 2 is a view of one side thereof in perspective.

A A represent the fronts of a corset, each of which is cut entirely through from top to bottom on the line *a a*. In the upper part of this cut is inserted the center gore, B, of the bust, the two parts of each front being sewed together from the point of the gore B downward. On each side of the center gore, B, is a side gore, C, inserted in the usual manner by simply cutting or splitting the front to a suitable depth.

I am aware that a corset having three bust-gores in each front is not new, and I do not claim such, broadly, as my invention. Such gores have heretofore been inserted in the ordinary manner without any seam intersecting the middle gore, and hence they could not be made to fit perfectly to the body; but by cutting the middle gore, B, entirely through, as above described, forming the seam *a* to intersect it, the patterns may be cut in such a way that a most graceful curve is obtained, and the corset will fit perfectly, with ease and comfort to the wearer.

Having thus fully described my invention, what I claim as new, and desire to secure by Letters Patent, is—

A corset having in each front at the bust two side gores, C C, and a middle gore, B, the latter extending to and intersecting the seam *a*, substantially as and for the purposes herein set forth.

In testimony that I claim the foregoing as my invention, I hereunto affix my signature.

DAVID H. FANNING.

Witnesses:
    GEO. H. CONKLIN,
    BENJ. L. SAMPSON.